(12) United States Patent
Correa

(10) Patent No.: US 12,017,870 B2
(45) Date of Patent: Jun. 25, 2024

(54) METHOD AND APPARATUS FOR ROBOTIC OBJECT PICK AND PLACE

(71) Applicant: Innovative Consulting LLC, Berlin, MD (US)

(72) Inventor: Rafael S. Correa, Berlin, MD (US)

(73) Assignee: Innovative Consulting LLC, Berlin, MD (US)

( * ) Notice: Subject to any disclaimer, the term of this patent is extended or adjusted under 35 U.S.C. 154(b) by 0 days.

(21) Appl. No.: 17/973,141

(22) Filed: Oct. 25, 2022

(65) Prior Publication Data

US 2023/0257216 A1 Aug. 17, 2023

Related U.S. Application Data

(63) Continuation-in-part of application No. 17/464,292, filed on Sep. 1, 2021, now Pat. No. 11,477,968.

(51) Int. Cl.
*B25J 15/06* (2006.01)
*B65G 47/91* (2006.01)

(52) U.S. Cl.
CPC .......... *B65G 47/91* (2013.01); *B25J 15/0625* (2013.01); *B25J 15/0683* (2013.01); *B65G 2201/0208* (2013.01)

(58) Field of Classification Search
CPC ................ B25J 15/0625; B25J 15/0658; B25J 15/0683; B25J 11/0045; B65B 23/08; A01K 43/00; B65G 47/91; B65G 47/917; B65G 47/918; B65G 2201/0208
USPC .......................................................... 294/184
See application file for complete search history.

(56) References Cited

U.S. PATENT DOCUMENTS

| | | | | |
|---|---|---|---|---|
| 2,798,757 A | * | 7/1957 | Jackson | B65B 23/08 271/103 |
| 3,230,001 A | * | 1/1966 | Hirt | B65B 23/08 414/791.7 |
| 3,656,794 A | * | 4/1972 | McCord | B66C 1/0212 D7/688 |
| 3,865,420 A | * | 2/1975 | Warren | B66C 1/0256 294/184 |
| 4,768,919 A | * | 9/1988 | Borgman | B65G 47/91 901/40 |
| 4,903,635 A | * | 2/1990 | Hebrank | B65G 47/915 435/303.1 |

(Continued)

*Primary Examiner* — Dean J Kramer
(74) *Attorney, Agent, or Firm* — Whiteford, Taylor & Preston, LLP; Peter J. Davis

(57) ABSTRACT

An object pick-up, transfer and placement apparatus which does not employ a source of negative pressure. A flexible bellows defines a collapsible interior chamber and a top through-bore in communication with atmospheric or greater pressure via a valve. The bellows collapses when contacting object, and the valve is closed, preventing air from entering the interior chamber. When the apparatus is used to lift the object, the bellows expands, causing reduced pressure in the interior chamber, securing the object to the apparatus. To release the object, the valve is opened, allowing entry of air to the interior chamber, and release of the object. This invention prevents contamination on egg shell surfaces to become air-born and cross-contaminate the entire egg pack, equipment surfaces, floors and other facility surfaces which in turn creates a hazardous working environment.

14 Claims, 18 Drawing Sheets

(56) References Cited

U.S. PATENT DOCUMENTS

| | | | | |
|---|---|---|---|---|
| 5,193,796 | A * | 3/1993 | Nagai | B65G 47/91 |
| | | | | 271/90 |
| 6,213,709 | B1 * | 4/2001 | Hebrank | A01K 43/00 |
| | | | | 414/737 |
| 7,083,208 | B2 * | 8/2006 | Ilich | B08B 9/00 |
| | | | | 294/64.2 |
| 8,025,028 | B2 * | 9/2011 | Correa | A01K 45/007 |
| | | | | 119/6.8 |
| 9,332,738 | B2 * | 5/2016 | Hebrank | A01K 43/00 |
| 11,477,968 | B2 * | 10/2022 | Correa | B25J 15/0683 |
| 2010/0244344 | A1 * | 9/2010 | Mougin | B65B 23/08 |
| | | | | 269/21 |

* cited by examiner

METHOD AND APPARATUS FOR ROBOTIC OBJECT PICK AND PLACE

BACKGROUND OF THE INVENTION

Field of the Invention

The present invention relates to robotic devices for picking and placing of discrete objects, and more particularly to egg handling equipment.

Description of the Background

Robotics are widely used in industry when repetitive tasks are required. The present invention improves and simplifies the application of suction cups in robotic transfer of single and, particularly, of multiple objects, addressing the challenges of how to effectively grip, pick and place objects while maintaining object integrity, orientation, cleanliness and sanitation.

There are many methods utilized within the robotic industry to grip objects, including electromagnets, mechanical gripping fingers, and vacuum/suction cups.

Vacuum/suction cups are well known in the art and are widely used because of their low cost, availability, adaptability, and serviceability.

Suction cup devices of the prior art rely on a central and communal vacuum source for simultaneous lifting of a plurality of objects. To account for situations in which not all suction cups are occupied, the prior art systems use a vacuum generator (vacuum pump, venturi system, or centrifugal fan) with sufficient capacity to overcome pressure lost equivalent to the number of unoccupied cups.

Prior art suction cups are designed with an orifice as an access point for connecting the negative pressure source. For object pick up, the suction cups are placed over the objects and a vacuum force is applied to all cups simultaneously to create active negative pressure between the cups and their respective objects. When the objects are to be released, the active negative pressure is reversed to positive pressure using the same conduit used during vacuum. The current state of the art device for egg pick-up and transfer is described in U.S. Pat. No. 8,025,028 which uses a common vacuum source and vacuum chamber. The in-Ovo technology industry has made great technological advances in identifying clear eggs (infertile) and dead embryos (exploders or bangers, bombs and leakers) and the robotic removal thereof from the incubation setter tray. Consequently, the number of empty spots can vary significantly from one egg transfer/setter tray to the next. This has resulted in a continuous need for increased vacuum volume to make up for negative pressure lost due to suction cups open to atmosphere, requiring increasingly powerful vacuum sources.

SUMMARY OF THE INVENTION

The inventor has discovered, to the surprise of the entire industry, that the vacuum sources for these systems, typically open-ended/non-return centrifugal vacuum pumps and/or venturi systems, and, even more so, the inaccessible vacuum plenum located directly above an array of suction cups are a significant source of chicken house and egg hatchery contamination.

Accordingly, there is provided according to an embodiment of the invention, an egg pick-up and transfer system capable of replacing and improving existing shortcomings for the variety of vacuum powered suction cup systems currently in use.

According to another embodiment of the invention, there is provided an egg pick-up and transfer system configured to lift and release objects on command without the need of a negative pressure source.

According to another embodiment of the invention, there is provided an egg pick-up and transfer system configured to maintain static reduced pressure during the transfer of a plurality of objects without a source of negative pressure/suction, regardless of how many pick-up locations are open to atmosphere.

According to another embodiment of the invention, there is provided an egg pick-up and transfer system configured to provide individual and independent pick-up of any number of eggs in a transfer setter tray, from one egg, to all eggs.

The present pick-up and transfer system includes a separate valve for each pick-up location that can be operated either electronically, pneumatically, or hydraulically.

Furthermore, a control system for actuating the valves can be actuated either locally or remotely, attached to each individual electronic pick-up cup (hereinafter "e-PUC"), whether using a single or multiple e-PUCs in one platform, connected individually or in daisy chain or manifold to simultaneously open and close all valves or selectively open and close any one or more valves.

According to another embodiment of the invention, there is provided an egg pick-up and transfer system configured to provide a burst of air to blow dirt, dust, debris, and contamination away from surface of the egg prior to being lifted.

According to another embodiment of the invention, there is provided an egg pick-up and transfer system configured to provide a controllable, and optionally unidirectional, flow of fresh air to inhibit contamination. According to another embodiment of the invention, there is provided a method and system for automatic, programmable disinfection for a single or a plurality of e-PUCs, for example using inert gas, and/or air ozone combination for continuous disinfection during operation, for example before each egg pick-up operation, after each egg release operation, and/or periodically throughout an operating period. According to these embodiments, the egg is released by replenishing the interior hollow cavities of individual e-PUCs with an optionally unidirectional air flow from a fresh air or gas source at atmospheric or greater pressure, collected away from contaminated areas, optionally maintaining unidirectional air flow (never reversing gas flow direction), thus preventing dirt, dust, and other contaminants, including bio-contaminants, to internal components.

According to another embodiment of the invention, there is provided an egg pick-up and transfer system featuring a lack of entrapment areas that provide safe harbor for harmful contamination.

According to another embodiment of the invention, there is provided an egg pick-up and transfer system configured to operate under a low voltage electronic/electric, signal from a control system to an actuator, preferably a solenoid valve, which may be actuated electrically, pneumatically, or hydraulically.

According to another embodiment of the invention, there is provided an egg pick-up and transfer system configured to operate under manual control or using a programmable logic controller (PLC).

This method of controlling individual e-PUCs simultaneously eliminates the requirement of a vacuum source, as there is no need for vacuum makeup caused by open-ended pick-up locations. Moreover, the elimination of the vacuum source, and the vacuum plenum above the suction cups, significantly reduces the incidence of contamination from entering the system and subsequently exhausted into the working environment, thereby also reducing a hazardous working environment for equipment operators.

The foregoing described features and embodiments, together with other objects and advantages which will become subsequently apparent, reside in the details of construction and operation as more fully hereinafter described and claimed, reference being had to the accompanying drawings forming a part hereof, wherein like numerals refer to like parts throughout.

Figure 1:
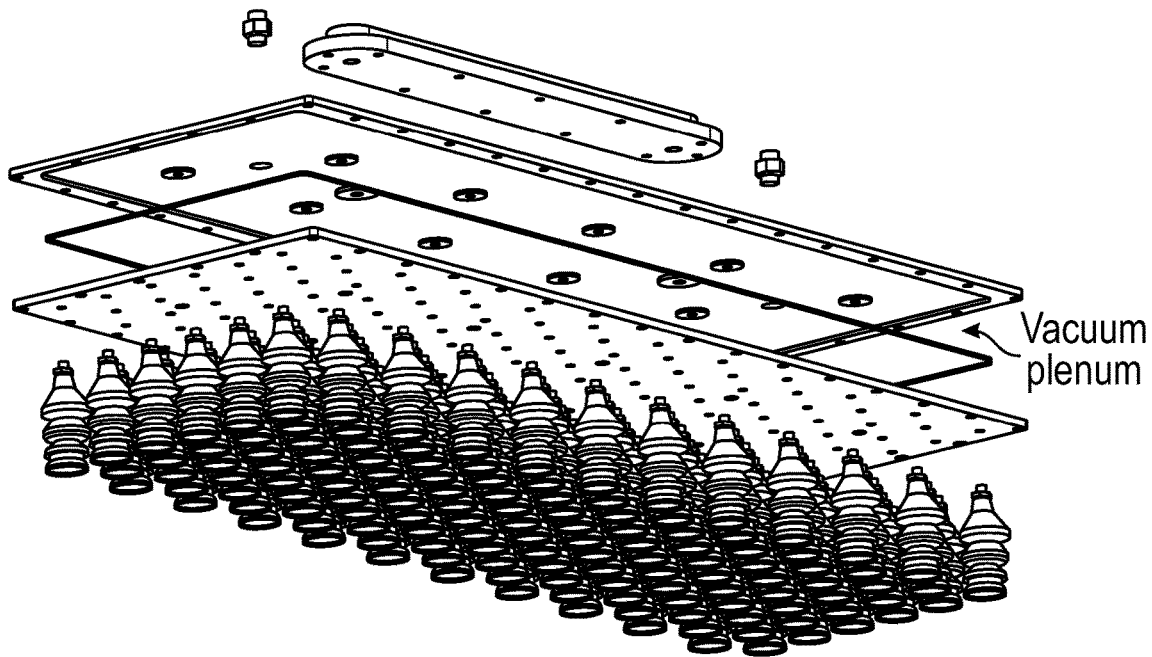
FIG. 1 is an exploded bottom side perspective view of a transfer support plate and suction cup assembly with common vacuum chamber and vacuum source (not shown) in accordance with the prior art.
Figure 2:
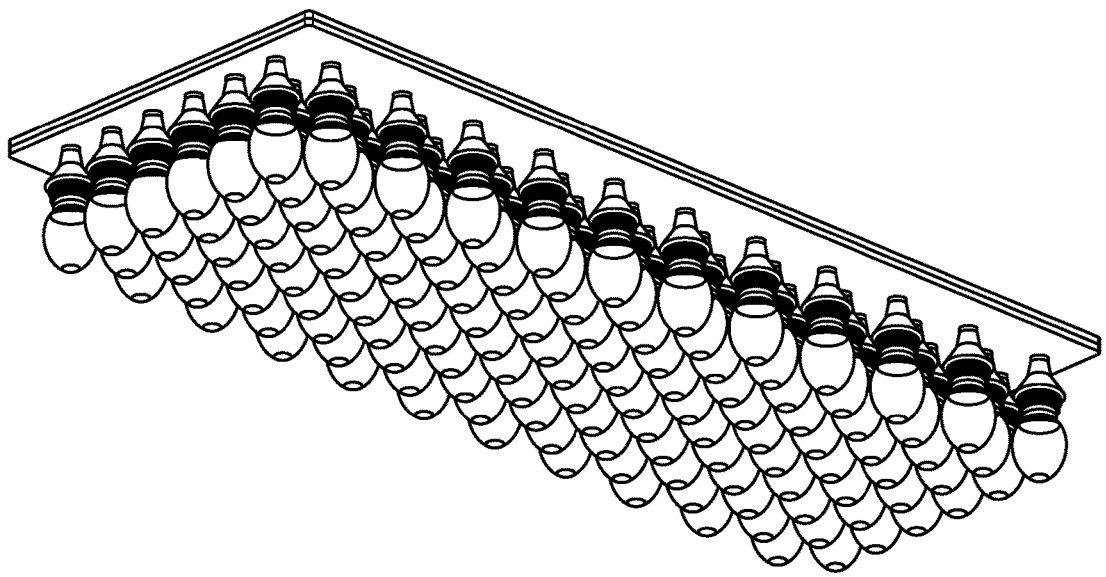
FIG. 2 is a bottom side perspective view of the transfer support plate and suction cup assembly as shown in FIG. 1, when assembled, with each suction cup assembly gripping an egg.
Figure 3A:
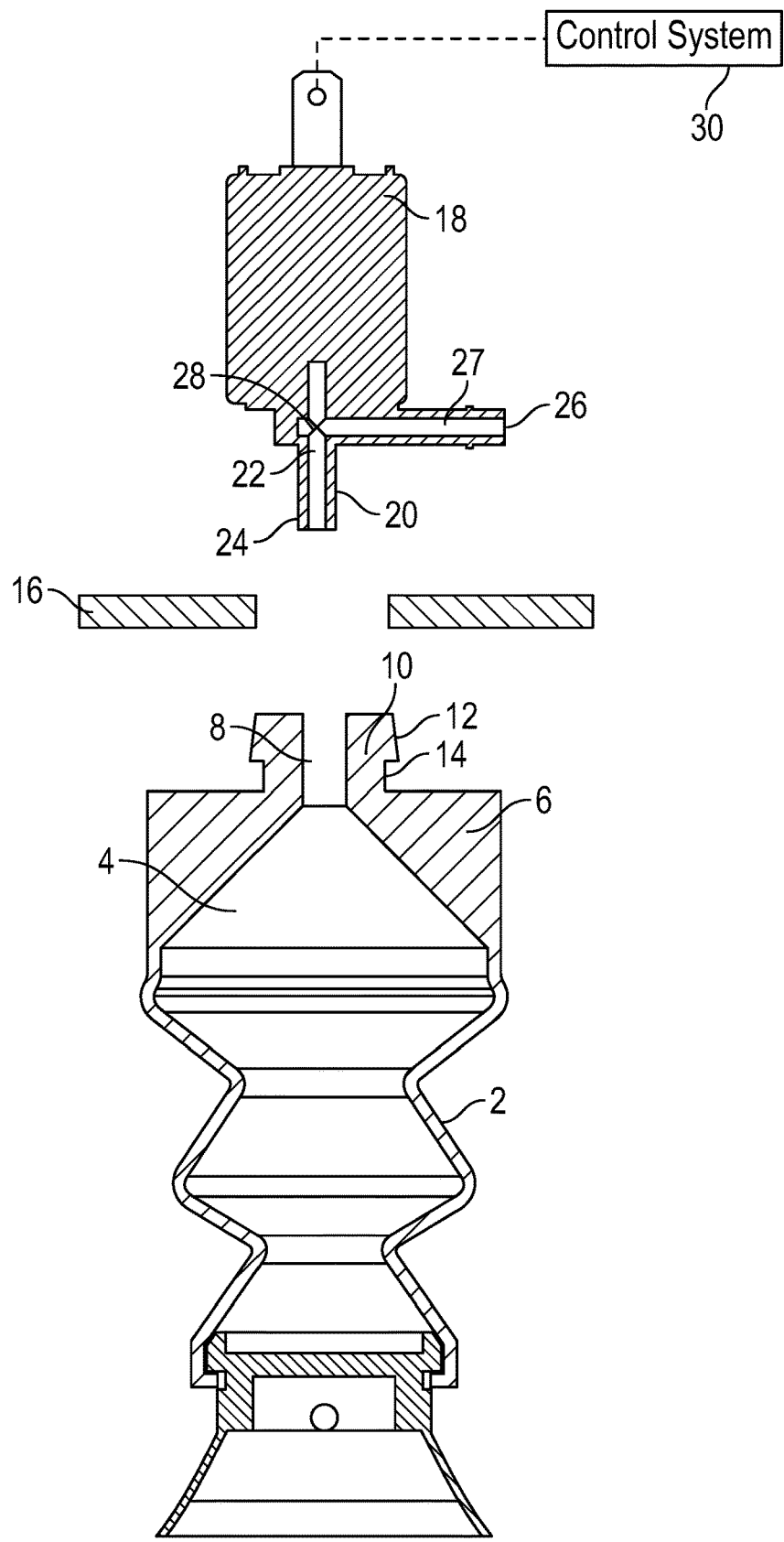
FIG. 3A is an exploded cross-sectional view of an apparatus for object pick up and place according to an embodiment of the invention with the bellows in the uncompressed or "release" position.
Figure 3B:
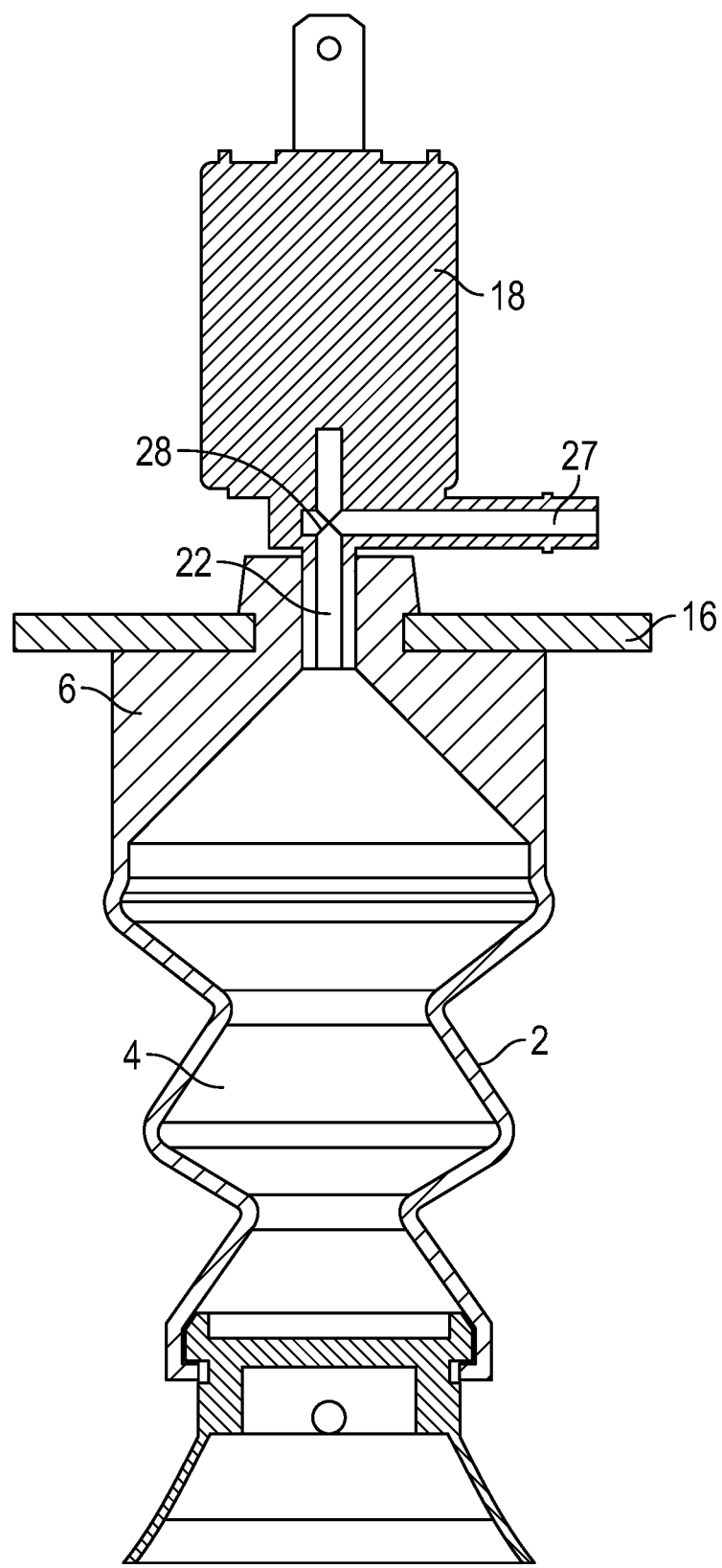
FIG. 3B is a cross-sectional view of an assembled apparatus according to the embodiment of FIG. 3A.
Figure 4:
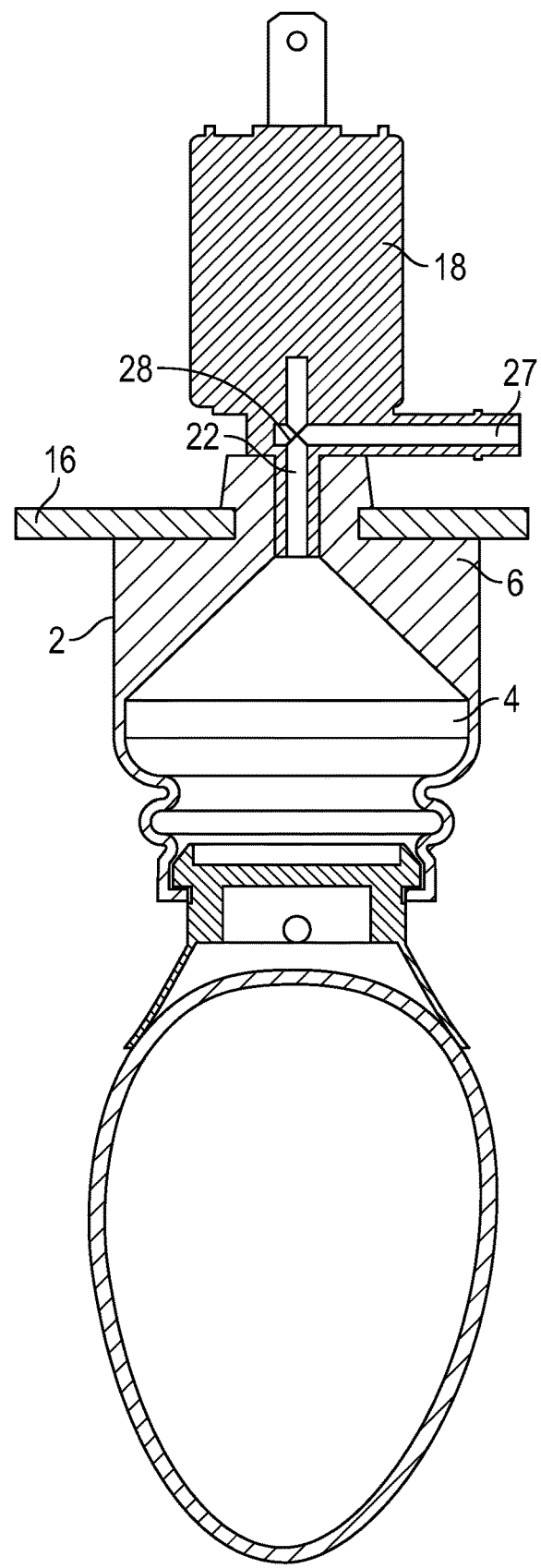
FIG. 4 is a cross-sectional view of an apparatus for object pick up and place according to another embodiment of the invention, with the bellows compressed and the valve in the closed or "pick-up" position.
Figure 5:
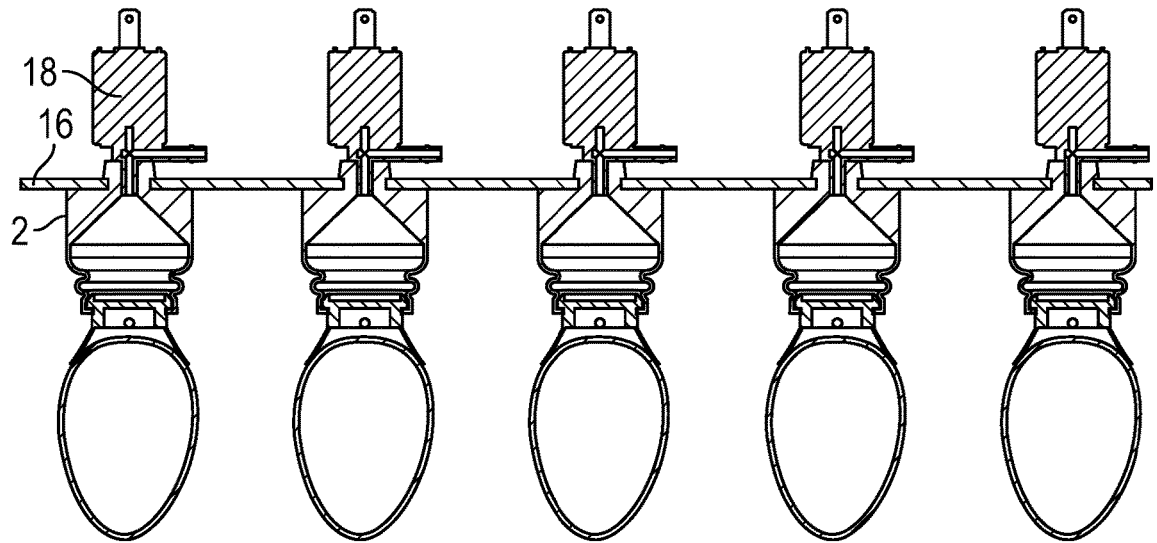
FIG. 5 is a cross-sectional view of an apparatus for object pick up and place corresponding to the embodiment of FIG. 4, but with multiple pick-up devices arranged in a support plate array, with the bellows compressed and the valves in the closed or "pick-up" position.
Figure 6:
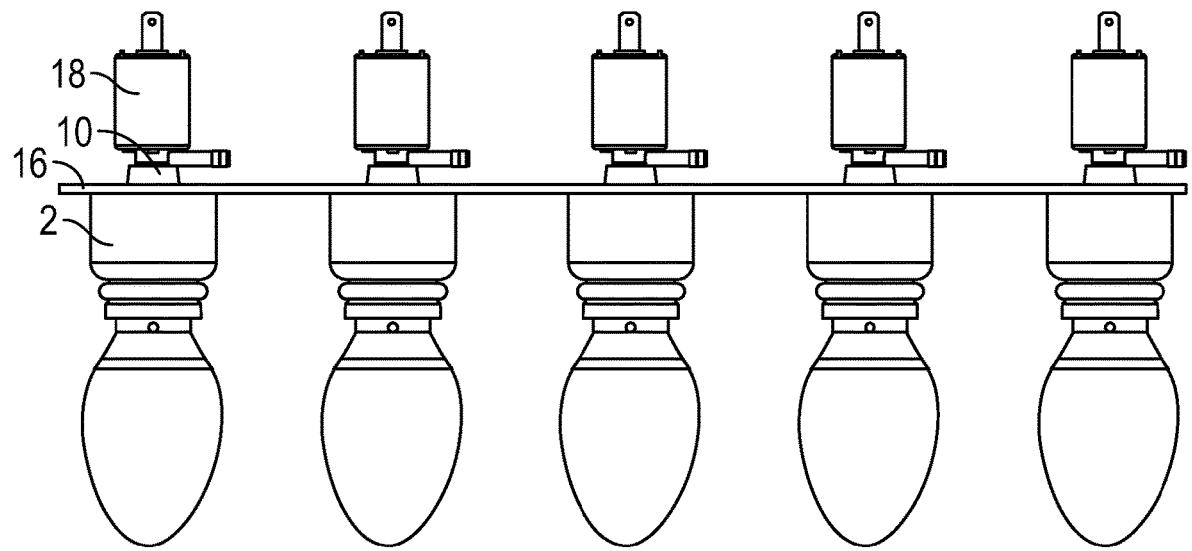
FIG. 6 is a side view of the embodiment shown in FIG. 5.

Features in the attached drawings are numbered with the following reference numerals:

| | |
|---|---|
| 2 | Flexible bellows |
| 4 | Hollow interior |
| 6 | neck portion |
| 8 | Interior channel |
| 10 | Top of neck portion |
| 12 | Exterior surface of neck portion |
| 14 | Groove |
| 16 | Support Plate |
| 18 | Valve assembly |
| 20 | Stem portion |
| 22 | Channel |
| 24 | Distal face |
| 26 | Exterior port |
| 27 | Air/vapor/solution supply tube |
| 28 | Valve |
| 30 | Control system |
| 31 | Anti-sway collar |

-continued

| | |
|---|---|
| 32 | Egg interface |
| 33 | Enlarged bellows portion |
| 34 | Lateral holes |
| 36 | Annular midsection |
| 38 | Vacuum ring |
| 40 | Vertical holes |
| 42 | Top wall |
| 44 | Circular rim |
| 46 | Receiving curl |
| 48 | Outer seal |
| 50 | Inner seal |
| 54 | Air chamber |
| 56 | Supply valve |
| 58 | Hollow piston |
| 60 | Piston actuator |
| 62 | Second/lower support plate |
| 64 | Flexible hose |
| 66 | Bellows subsection |
| 66a | Top bellows subsection |
| 66b | Middle bellows subsection |
| 68 | Bellows subsection top surface |
| 70 | Bellows subsection bottom surface |

DETAILED DESCRIPTION

Referring to FIGS. 3A-14, the e-PUC assembly of the invention is characterized by a flexible bellows 2 having a hollow interior 4 and a neck portion 6. The neck portion 6 is formed with an interior channel 8 between the hollow interior 4 of the flexible bellows 2 and the top 10 of the neck portion 6. The exterior surface 12 of the neck portion 6 is provided with a groove 14 dimensioned and configured for a friction or snap fit into a support plate 16. A valve assembly 18 is positioned above and supported by the neck portion 6 and includes a stem portion 20 that is configured and dimensioned to friction fit into the interior channel 8 of the neck portion 6 of the flexible bellows 2. In this way, the invention provides for quick and easy removal and replacement of individual e-PUCs, according to which the neck portion 6 of the e-PUC may be forced into a correspondingly sized hole in the support plate 16 until the edges of the hole in the support plate snap into groove 14. The groove inside diameter is preferably the same as the hole/perforation in the support plate; the groove width is preferably the same as the thickness of the support plate, and the groove depth preferably varies in accordance with the weight of object to be picked up, average 0.06" to 0.125". The stem portion 20, which optionally features a barbed end, is then forced into the interior channel 8 of the neck portion 6 until it snaps into place or is otherwise friction fitted into place, lending to the neck portion 6 sufficient rigidity to prevent it from being pulled out of the corresponding hole in the support plate 16. To remove an e-PUC from the assembly, the process is reversed. The stem portion 20 of the valve assembly is pulled out of the interior channel 8 of the neck portion 6 to overcome the snap or friction fit, at which time the neck portion 6 will be pliable enough to be pulled out of the corresponding hole in the support plate 16.

This method eliminates the need for additional hardware to attach the e-PUC to the valve assembly, and no tools are required for service, required maintenance, or replacement of e-PUCs.

Figure 7:
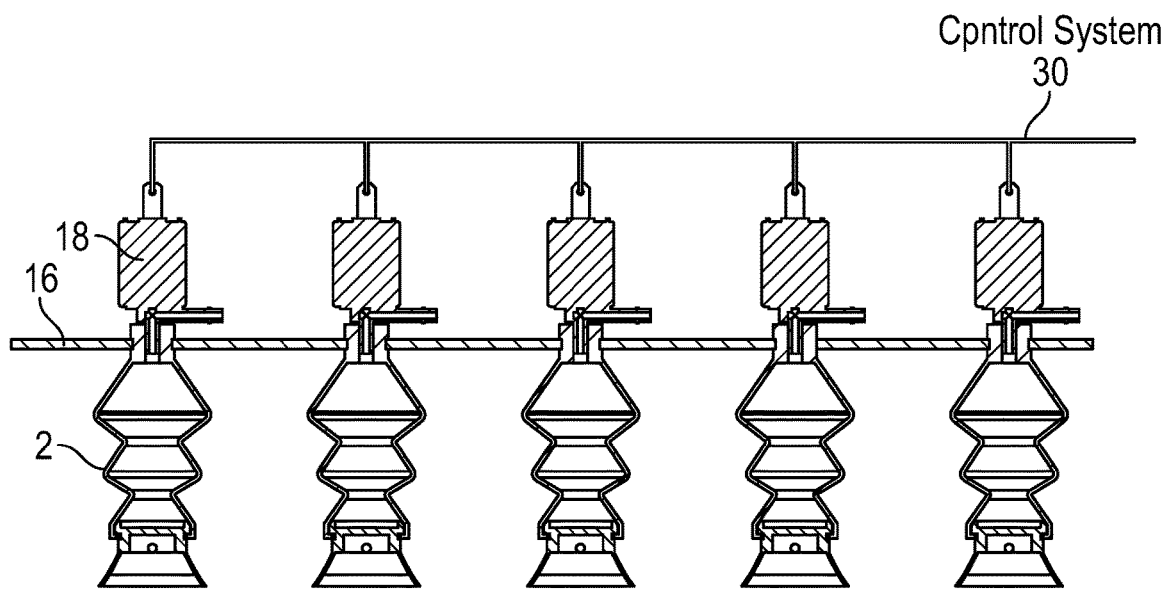
FIG. 7 is a cross-sectional view of a pick-up and place device according to an embodiment of the invention in which the control system is connected to a plurality of individual pick up and place devices with the exterior (air intake) port open to the ambient air.
Figure 8:
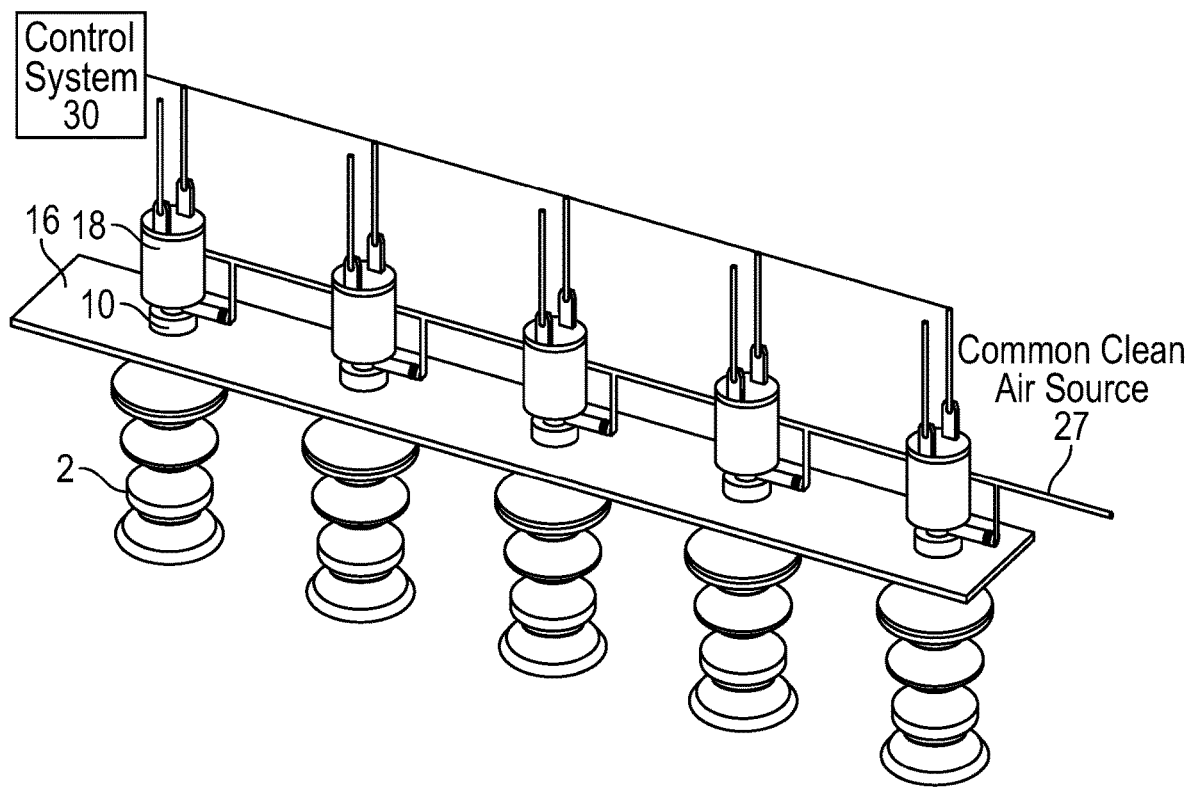
FIG. 8 is an overhead perspective view of another embodiment of the invention in which a control system is connected to a plurality of individual pick up and place devices, and the air/gas/vapor intake ports are connected to a common source.
Figure 9A:
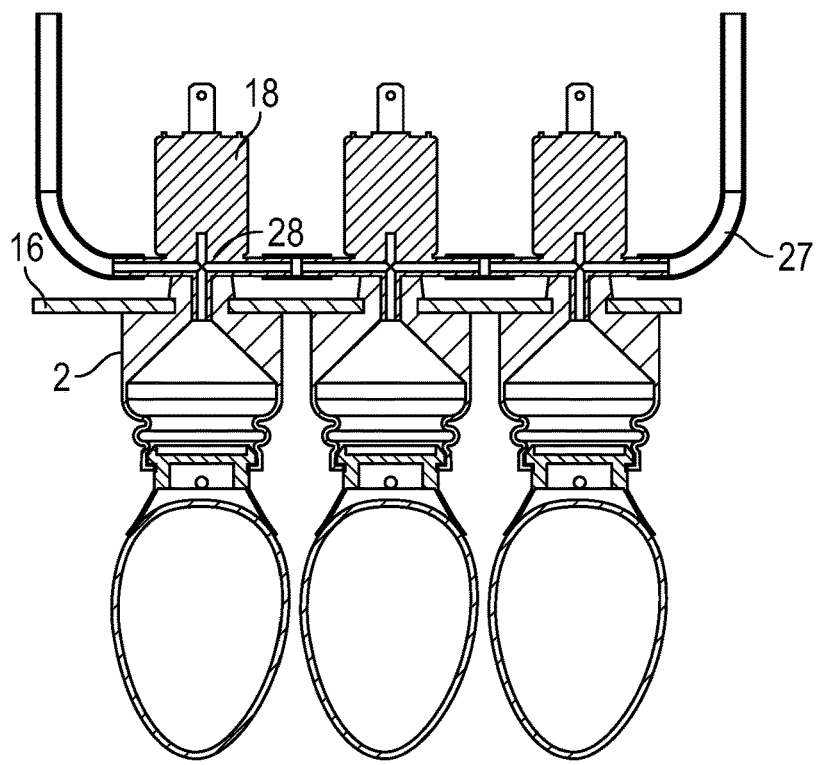
FIG. 9A is a cross-sectional view of an embodiment of the invention with the bellows compressed and the valves in the closed or "pick-up" position, in which the solenoid valve/air supply channel is T-shaped, and the air/gas/vapor intake ports are connected in series.
Figure 9B:
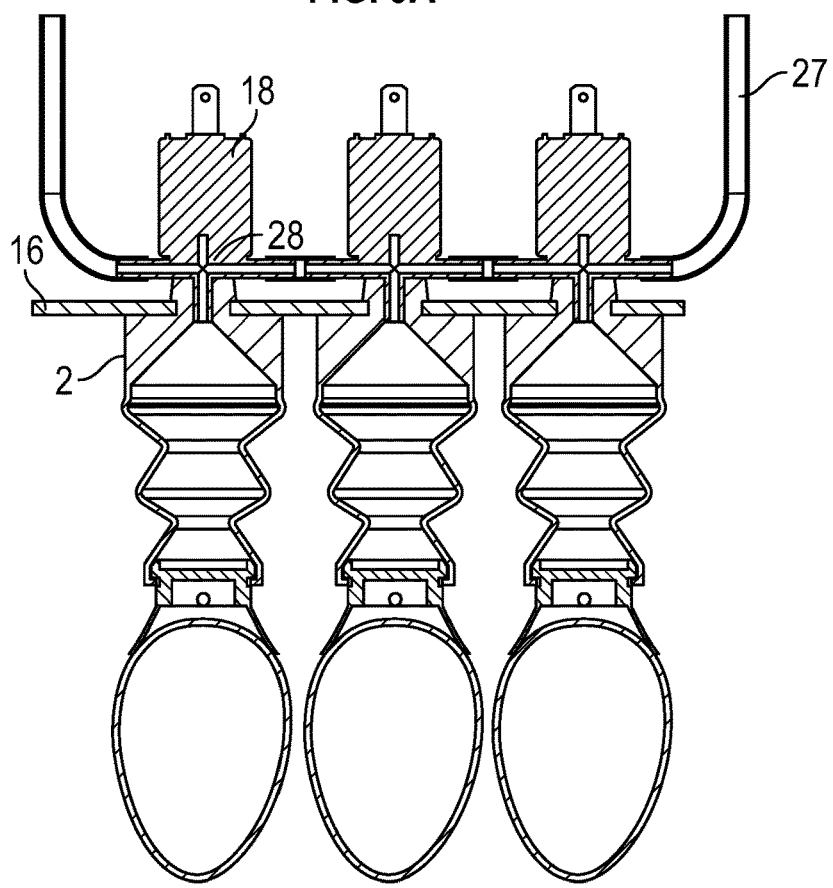
FIG. 9B is a cross-sectional view of the embodiment of Figured 9A, but with the bellows uncompressed and the valves in the open or "release" position.
Figure 10A:
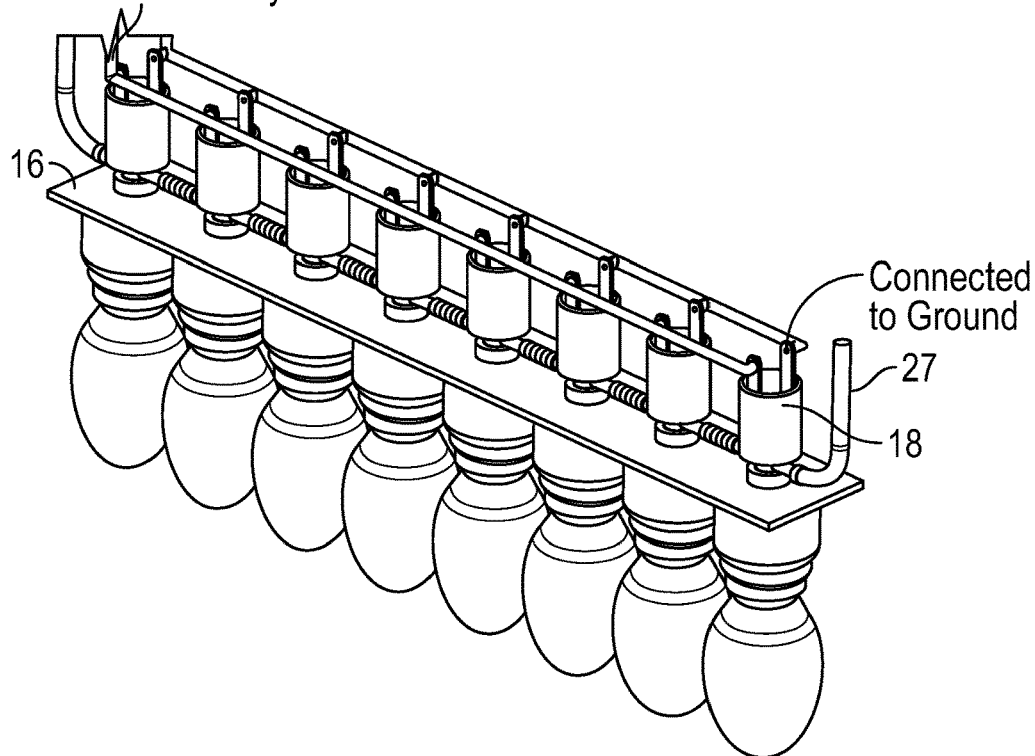
FIG. 10A is an overhead perspective view of an embodiment of the invention in the pick-up position in which the solenoid valve is T-shaped, the air/gas/vapor intake ports are connected in series, and which a control system is connected in series to a plurality of individual pick up and place devices.
Figure 10B:
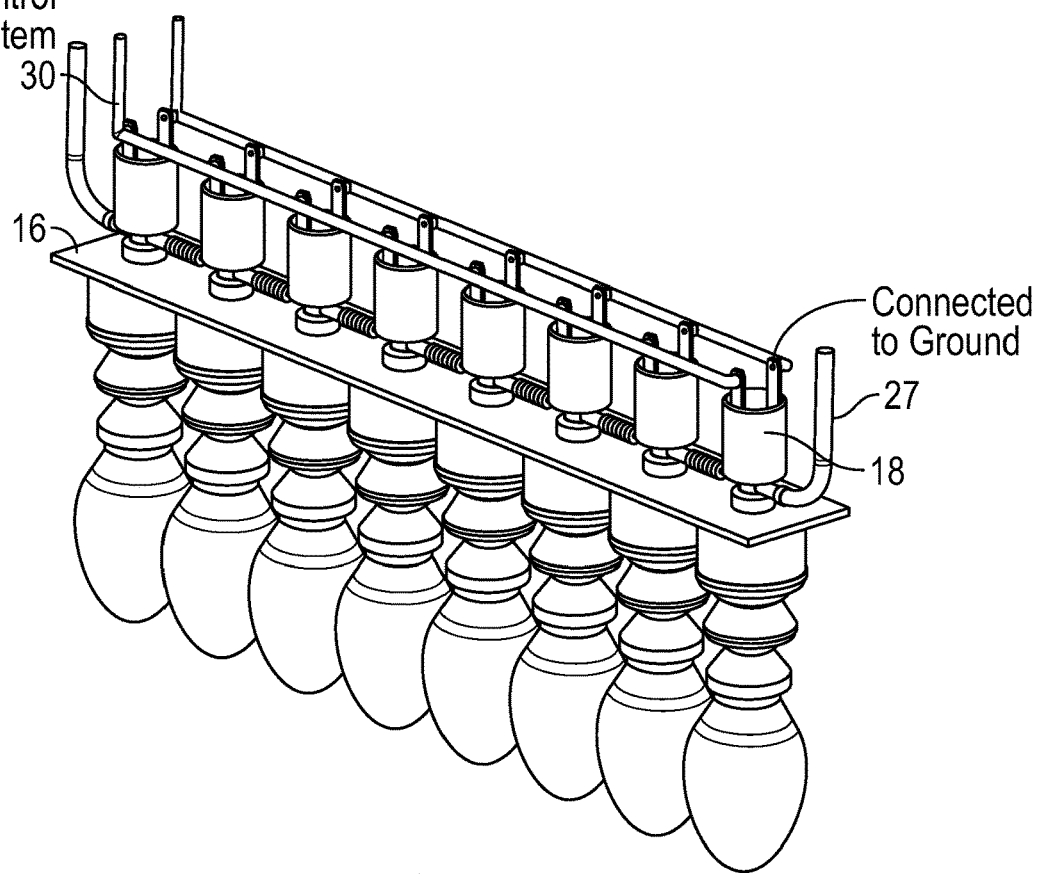
FIG. 10B is an overhead perspective view of the embodiment of FIG. 11A in the initial contact/release position.
Figure 11A:
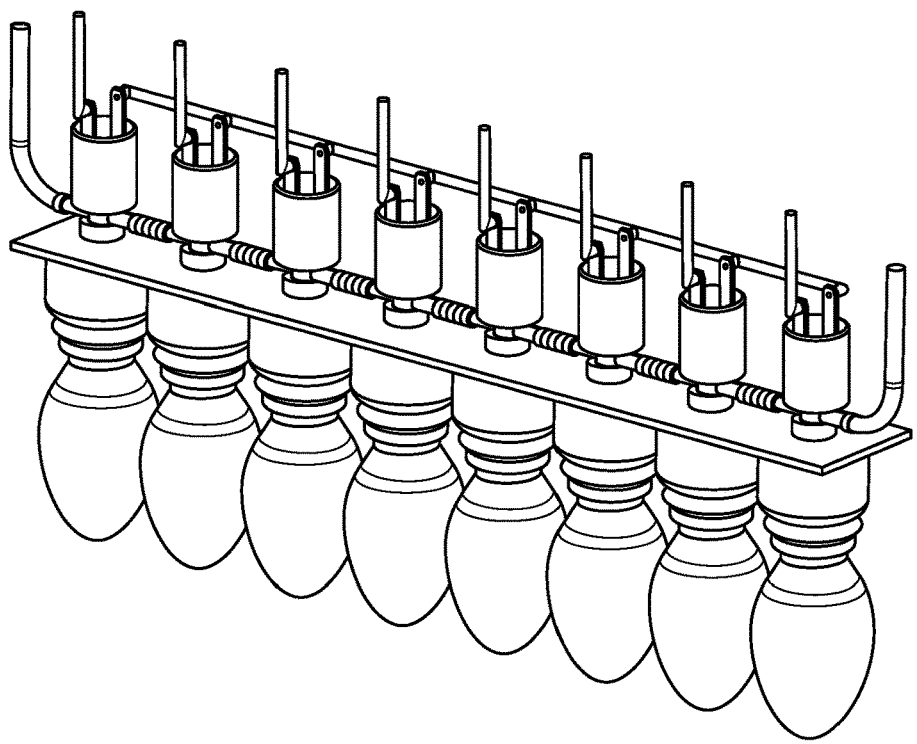
FIG. 11A is an overhead perspective view of an embodiment of the invention in the pick-up position in which the solenoid valve is T-shaped, the air/gas/vapor intake ports are connected in series, and which a control system is individually connected to a plurality of e-PUCs for independent control/actuation of each e-PUC.
Figure 11B:
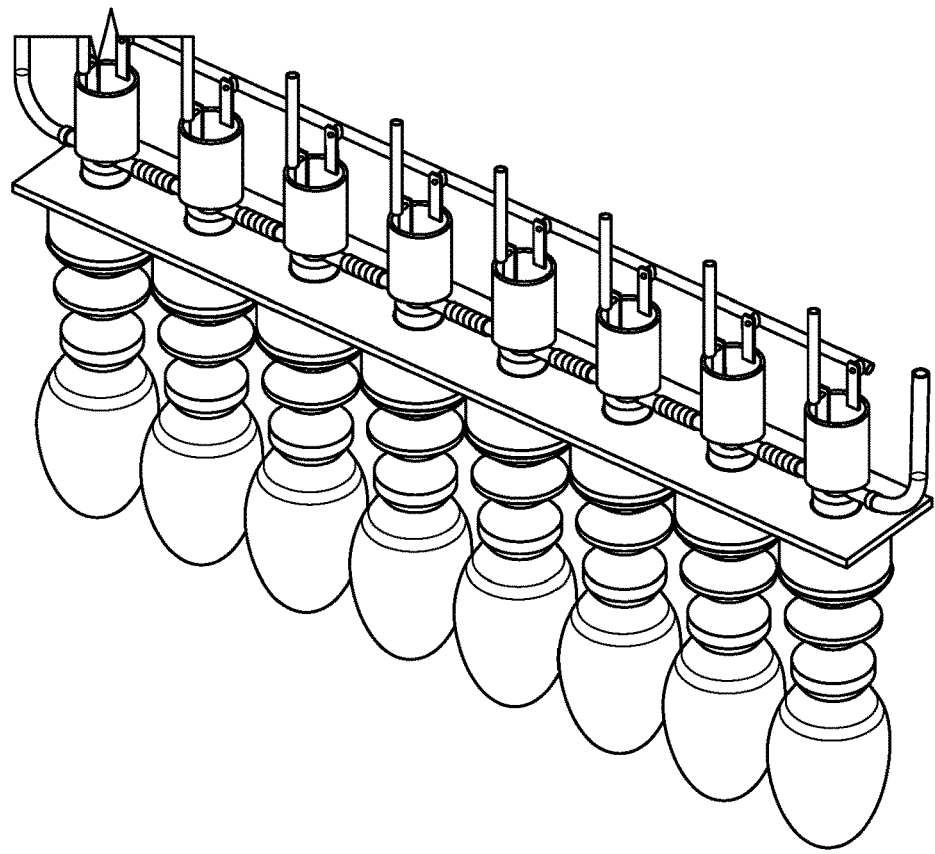
FIG. 11B is an overhead perspective view of the embodiment of FIG. 11A in the initial contact/release position.
Figure 12A:
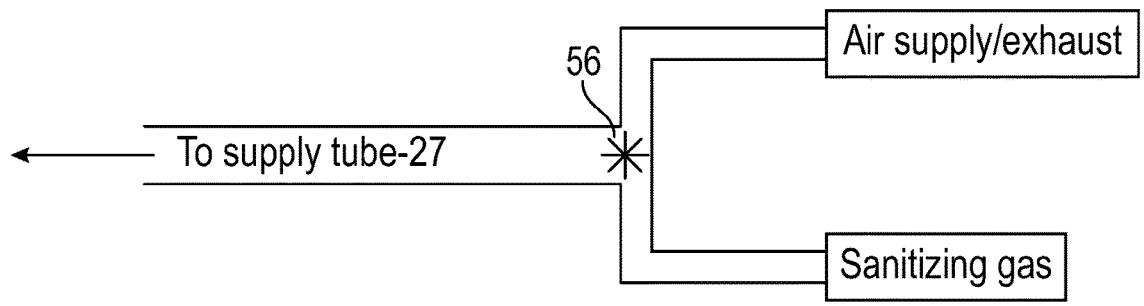
FIG. 12A is a representation of an embodiment of the air/gas/vapor/solution supply feature of the invention.
Figure 12B:
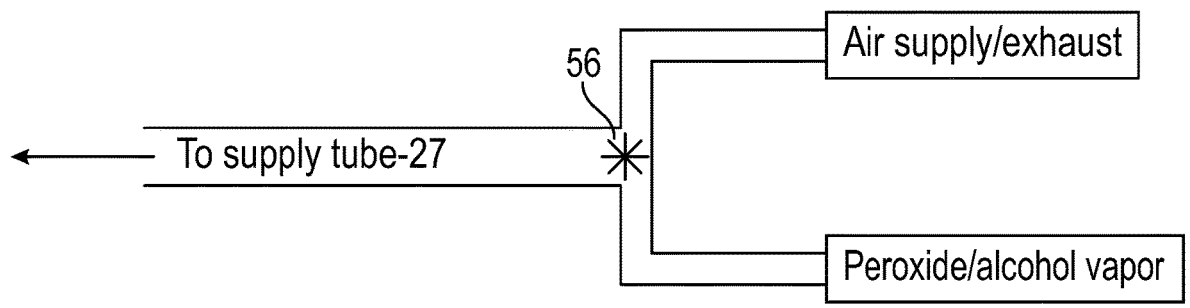
FIG. 12B is a representation of another embodiment of the air/gas/vapor/solution supply feature of the invention.
Figure 12C:
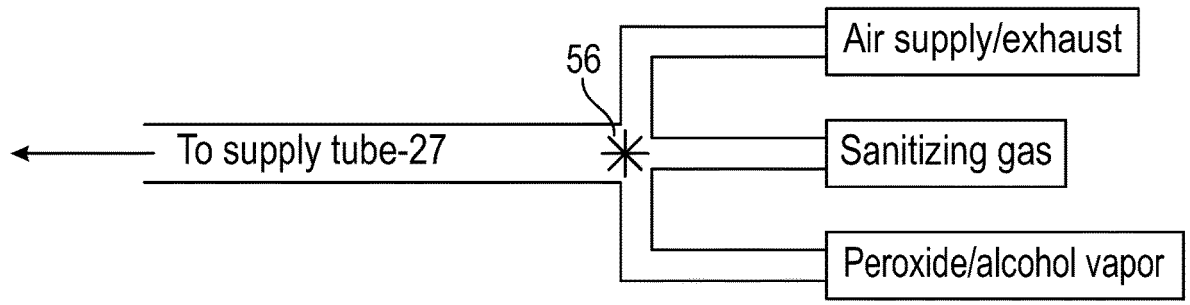
FIG. 12C is a representation of yet another embodiment of the air/gas/vapor/solution supply feature of the invention.

The valve assembly 18 further includes a channel 22 between an opening in the distal face 24 of the stem portion 20 and an exterior port 26 in communication with an air or other gas source at or above atmospheric pressure, either directly as shown for example in FIG. 7, or via supply tube 27; see. e.g., FIG. 8. A valve 28 is situated in the valve assembly 18 so as to reversibly block the passage of air/gas through the channel 22 upon command from a control system 30. The control system 30 may be connected to each valve assembly individually and in parallel, as shown in FIG. 10a, or in series, as shown in FIG. 9. The valve 28 may preferable be a solenoid valve, and may be activated by control system 30 electrically, pneumatically, or hydraulically. Exterior ports 26 may be open to local atmosphere as shown in FIGS. 3A-7, 13 and 14, or preferably may be connected to a common clean air source and dump as shown in FIG. 8, or to any combination of air/gas/vapor/solution supply sources, for example as shown in FIGS. 12A-12C. The channel 22 may optionally be T-shaped as shown in FIGS. 9A, 9B, 10A, 10B, 11A, 11B, 19 and 20 for serial connection between valve assemblies and may be connected to a source of air, sanitizing gas, peroxide/alcohol vapor, and/or other cleaning/sanitizing solution by supply tube 27. Between each pick-up action, or according to any selected period, for example at the end of each shift or each day, a sanitizing gas may be supplied via the T-shaped channel 22 and the valve assembly under control of the control system 30 to deliver the sanitizing gas, peroxide or alcohol vapor or other cleaning/sanitizing solution to the interior of the flexible bellows and optionally to the surface of any object. According to another optional feature, the valve assembly may be connected to a source of peroxide and/or alcohol vapor for a periodic wet cleaning cycle. FIGS. 12A-12C show non-limiting examples of various connections that may be made to the valve assemblies for supply of air, sanitizing gas, vapor and/or wet cleaning solution, under control of control system 30 and supply valve 56.

Figure 13:
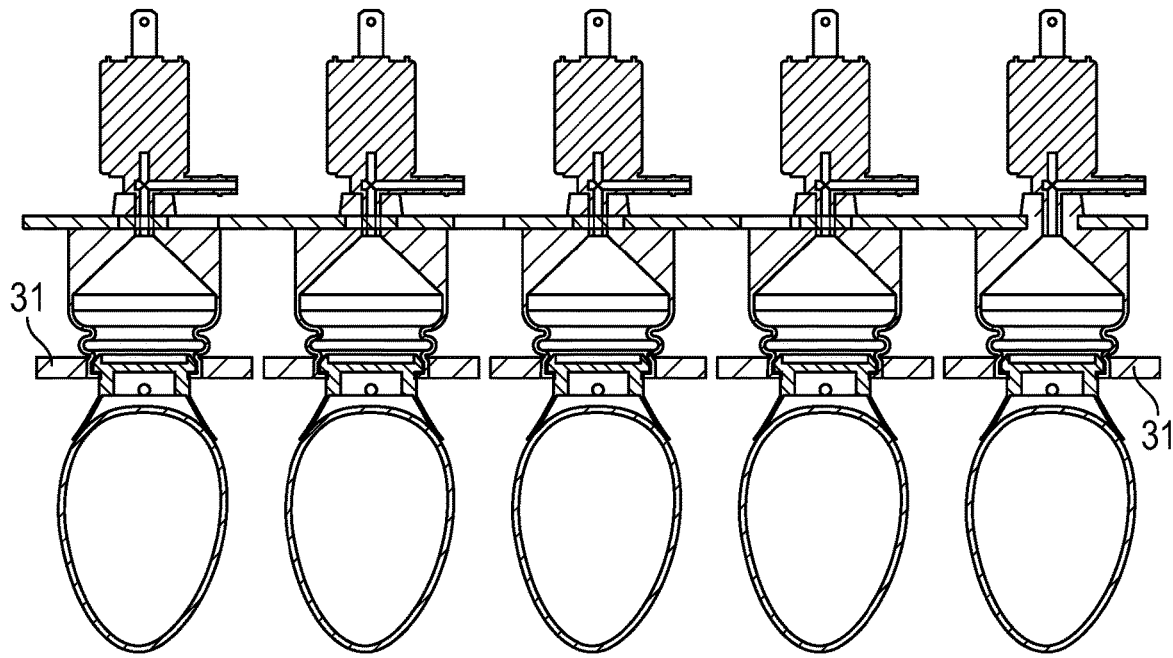
FIG. 13 is a cross-sectional view of an apparatus for object pick-up and place according to an alternate embodiment, featuring an anti-sway collar, with the bellows compressed and the valves in the closed or "pick-up" position.
Figure 14:
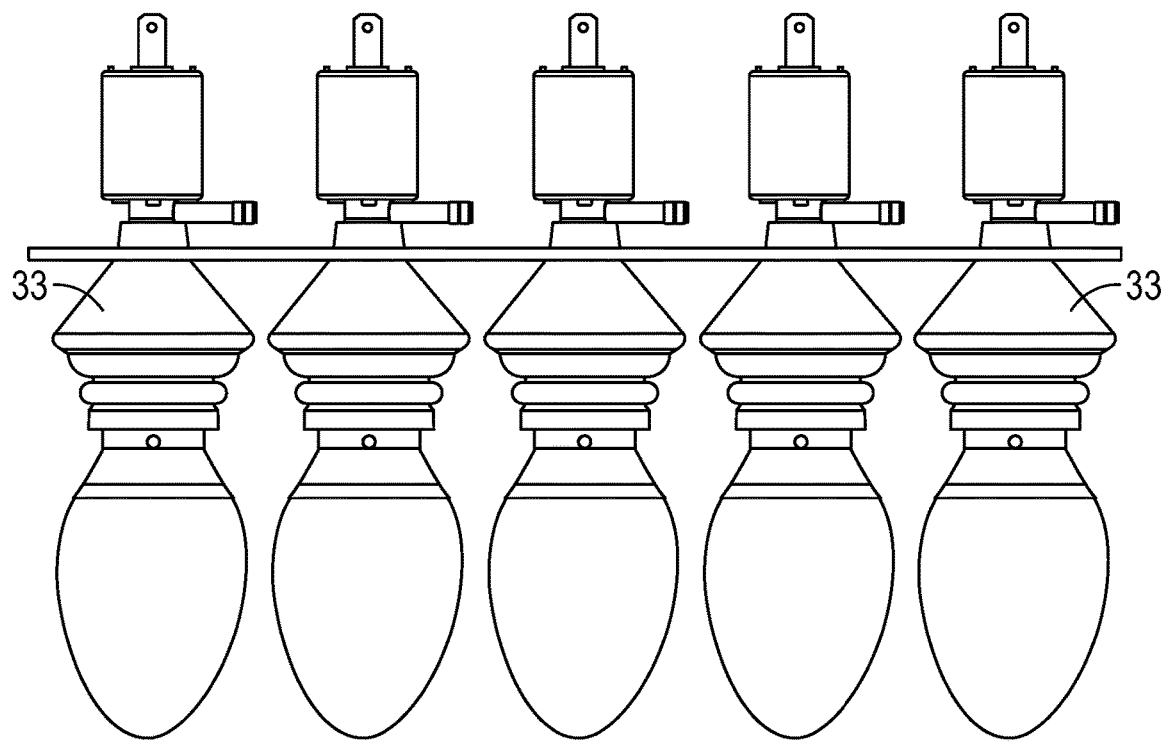
FIG. 14 is a cross-sectional view of an apparatus for object pick-up and place according to a second alternate embodiment, featuring an enlarged top bellows-subsection, with the bellows compressed and the valves in the closed or "pick-up" position.

The e-PUC assembly may optionally be provided with anti-sway features, as shown, for example, in FIGS. 13 and 14. According to one embodiment, shown in FIG. 13, the e-PUC assembly may be provided with an anti-sway collar 31 to inhibit egg sway and egg-to-egg contact. According to another embodiment, at least a portion of the bellows 2 may have diameter sized to prevent adjacent egg-to-egg contact. In the case of FIG. 14, the top portion 33 of the bellows 2 is enlarged, but any portion of the bellows, or the entire bellows, may be enlarged to prevent egg sway and egg-to-egg contact. According to a preferred embodiment, the largest diameter of the bellows may be 50% or more greater than the average egg width. According to the large bellows embodiment, increased holding power is provided due to the increase in volume of static air.

Each flexible bellows 2 may be provided at its pick-up end with a removable/replaceable egg interface 32 dimensioned and configured to fit onto a surface of the object to be picked up.

Details of the egg interface portion of the e-PUC assembly are illustrated in FIGS. 15-18. Both the bellows 2 and the egg interface 32 are made of a flexible plastic, rubber or other elastomeric material and are designed so that the bellows 2 and the attached egg interface 32 can adjust to any size egg or egg tilt by compressing against the egg. The compression procedure of the bellows 2 and sealing of the egg interface 32 against the egg, and closing of the valve 28 creates a sealed air space in hollow interior 4 which remains at atmospheric pressure, until the lift operation begins, at which time the weight of the egg causes expansion of the bellows and reduced pressure within the sealed air space, which reduced air pressure holds the egg to the egg interface 32. The egg interface 32 allows for approximately a one-half inch diameter space 54 on top of the egg to be continuously connected to atmospheric pressure through one or more lateral holes 34 located radially through the annular midsection 36 of the interface 32. The egg is picked up by the object interface 32 through a ring 38 caused by a series of vertical holes 40 evenly spaced around the egg interface 32. This permits the egg interface 32 to pick up an egg having been previously punctured on the top surface without creating negative pressure inside the egg.

Figure 15:
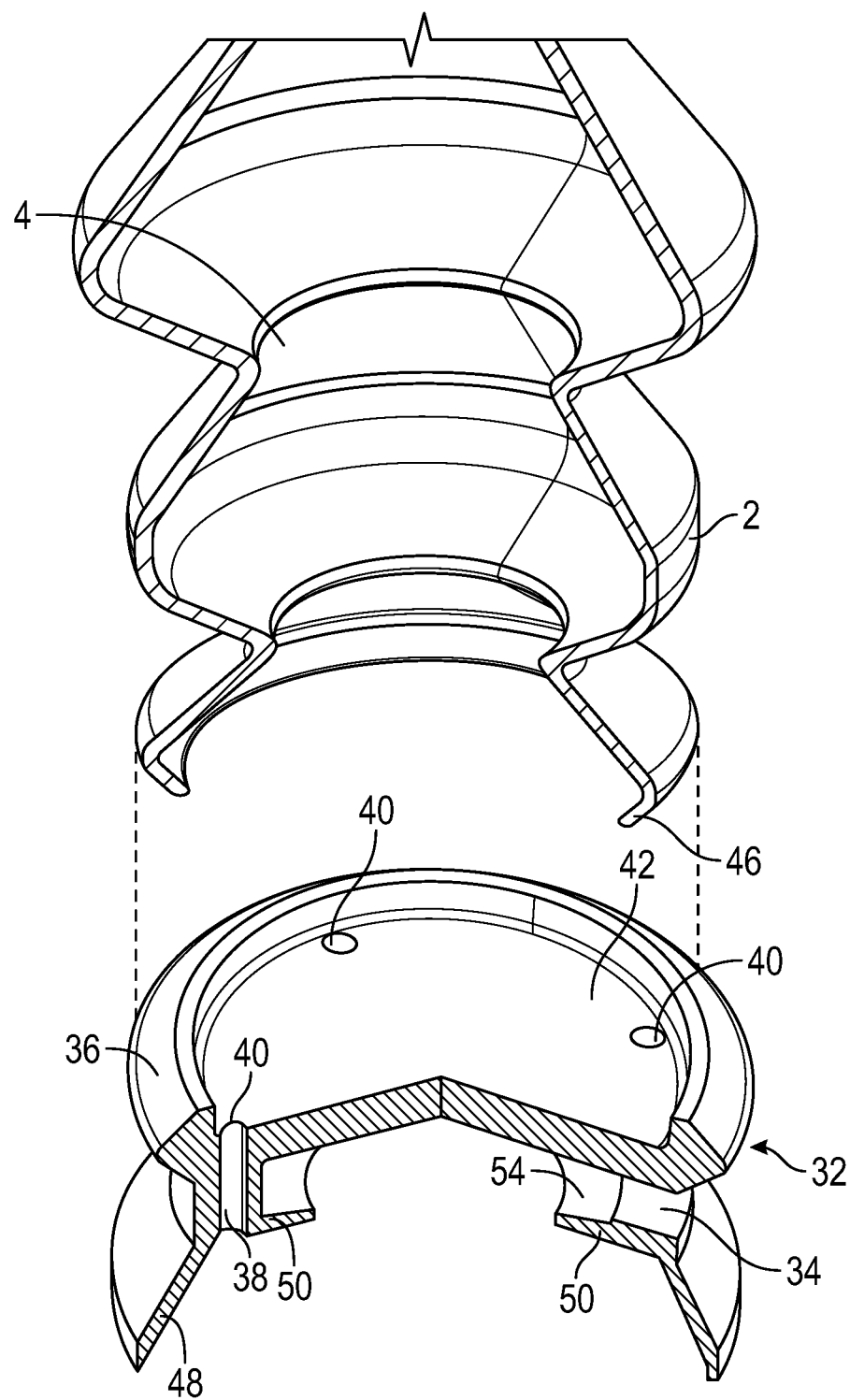
FIG. 15 is a partial cutaway, exploded perspective view of the flexible bellows and egg interface components of the e-PUC assembly according to an embodiment of the invention.
Figure 16:
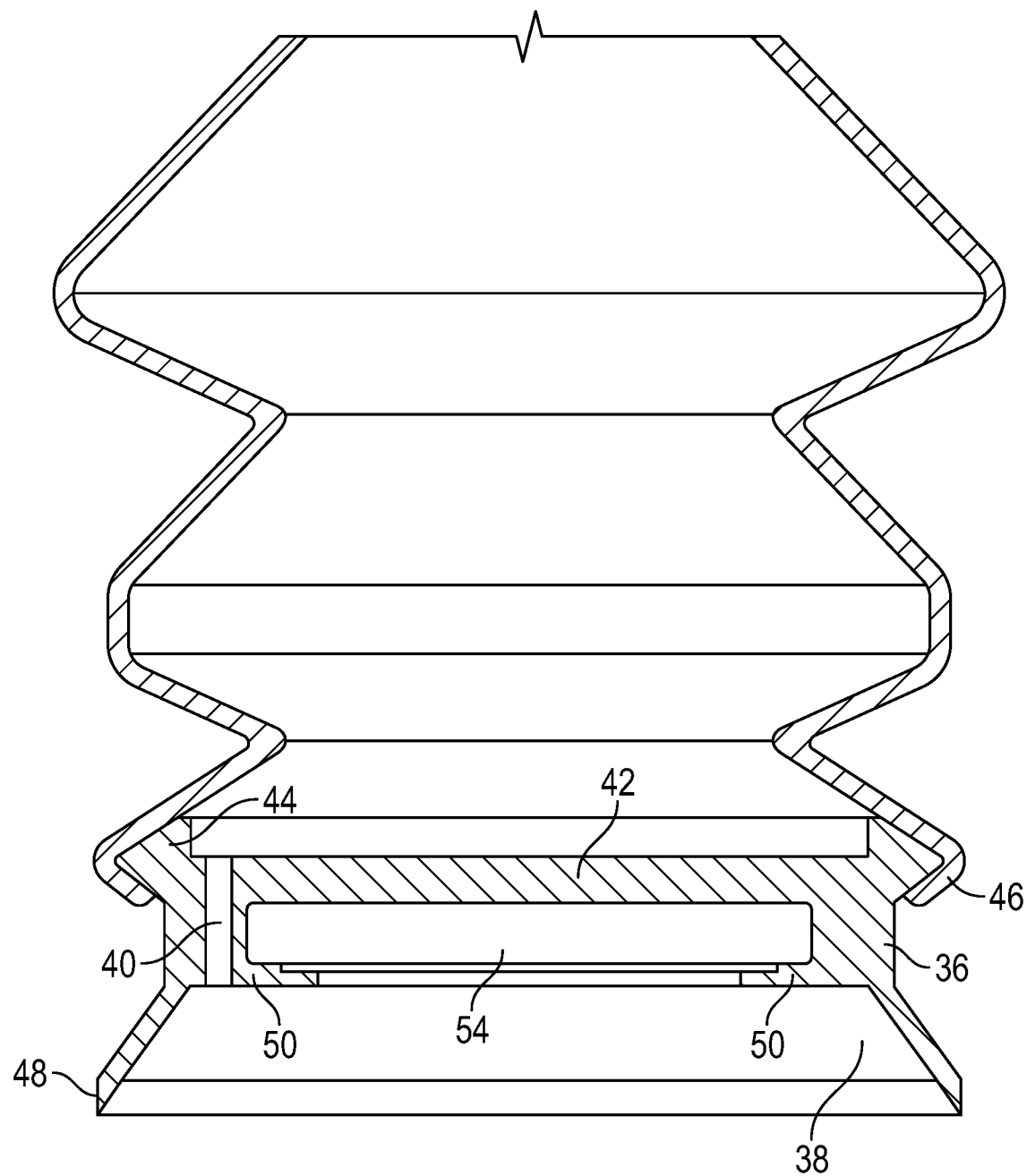
FIG. 16 is a partial cross-sectional view of the e-PUC assembly according to the embodiment of FIG. 15.
Figure 17:
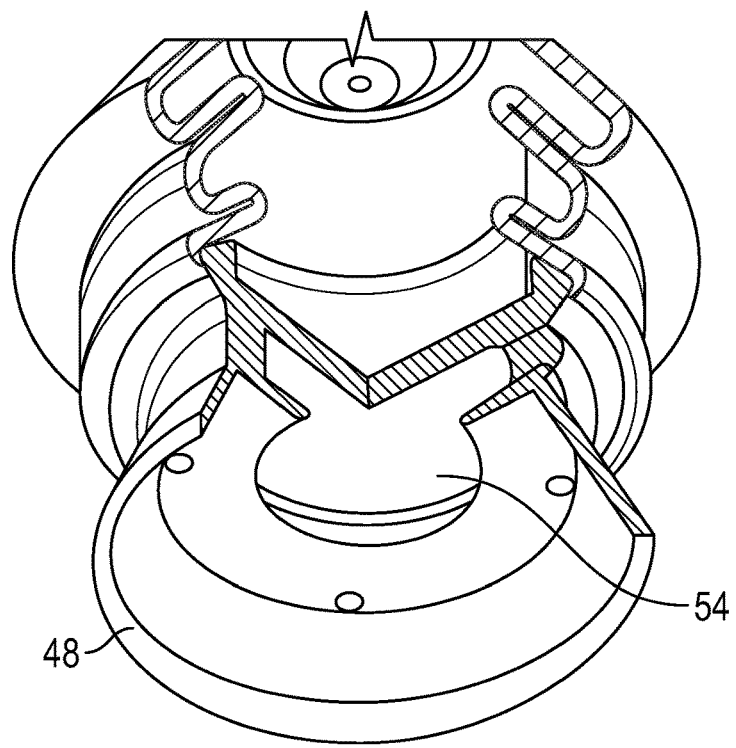
FIG. 17 is a partial cutaway, perspective view of the assembled e-PUC assembly according to the embodiment of FIG. 15, illustrating the components of the e-PUC assembly when in a compressed condition.
Figure 18:
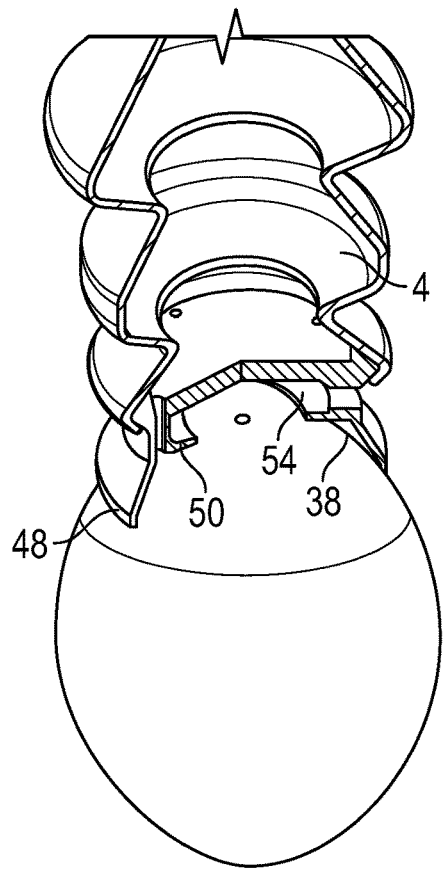
FIG. 18 is a partial cutaway perspective view of the assembled flexible bellows and egg interface components of the e-PUC assembly according to the embodiment of FIG. 15, with the egg interface gripping an egg.

The egg interface 32 mounted on the lower end of bellows 2 is generally cylindrical and includes a top wall 42 and an upstanding circular rim 44 which extends above wall 42. The upstanding circular rim 44 fits into the circular receiving curl 46 at the bottom of bellows 2 to assemble the egg interface 32 at the lower end of the bellows 2, as shown in FIGS. 15 and 16. When assembled, the top wall 42 of the egg interface 32 forms a lower wall of the hollow interior 4 within the bellows 2.

The bottom of the egg interface 32 includes a tapering flexible circular seal 48 which forms an outer seal with the outer shell surface of an egg when the interface 32 is positioned on the egg. Facing inwardly on the bottom of the egg interface 32, below wall 42 is an inner seal 50 which seals the egg interface 32 against the outer shell surface of the egg at a location spaced away from and above the outer seal 48 to form the circular ring 38. Vertical holes 40 through the annular midsection 36 provide air flow communication between the circular ring 38 and the hollow interior 4 of the bellows. Thus, as the support plate 16 descends in its downward stroke, and each egg interface 32 engages and seats on the upper outer surface of its aligned injected egg, the bellows 2 and bellows hollow interior 4 contract. This contraction forces air out through interior channel 8, valve assembly 18, where valve 28 is in the open position, channel 22, and out through exterior port 26. When the support plate 16 reaches the lowermost position of its downward stroke, the valve assembly 18 under control of control system 30 causes valve 28 to close, creating a sealed space between valve 28 and the egg surface. When the support plate 16 begins its upward stroke, the bellows 2 attempts to elongate creating a reduced pressure in the hollow interior 4 of the bellows relative to the local atmosphere which is communicated to the sealed circular ring 38 through holes 40 thus holding the egg to the bottom of the egg interface 32 in a circular ring spaced away from the egg perforation. Meanwhile, the air space 54 above the inner seal 50 and below the wall 42 is maintained at atmospheric pressure by the lateral holes 34 in the annular midsection.

Subsequently, when the support plate 16 and e-PUC assemblies have transferred the injected eggs to the desired location, valve 28 is opened, thus allowing air into the bellows hollow interior 4 and air ring 38, equalizing the pressure between the interior of the bellows and the surrounding atmosphere and releasing the eggs from egg interface 32. In the preferred embodiment, there are four 1/16 diameter holes 40 spaced vertically around the annular midsection 36. These holes permit the egg interface 32 to pick up eggs that have been previously perforated on the top surface without creating negative pressure inside the egg. The annular midsection 36 preferably has two radial holes 34 for maintaining atmospheric pressure in chamber 54 around the egg perforation.

In the case of the embodiments described above, the contact of the e-PUCs with the eggs and the compression of the bellows may be accomplished by lowering of the support plate 16 to the egg support assembly (not shown), or raising the egg support assembly to the e-PUCs. According to these embodiments, all e-PUCs supported in a support plate 16 move together, whether or not there is an egg located below each e-PUC.

Figure 19:
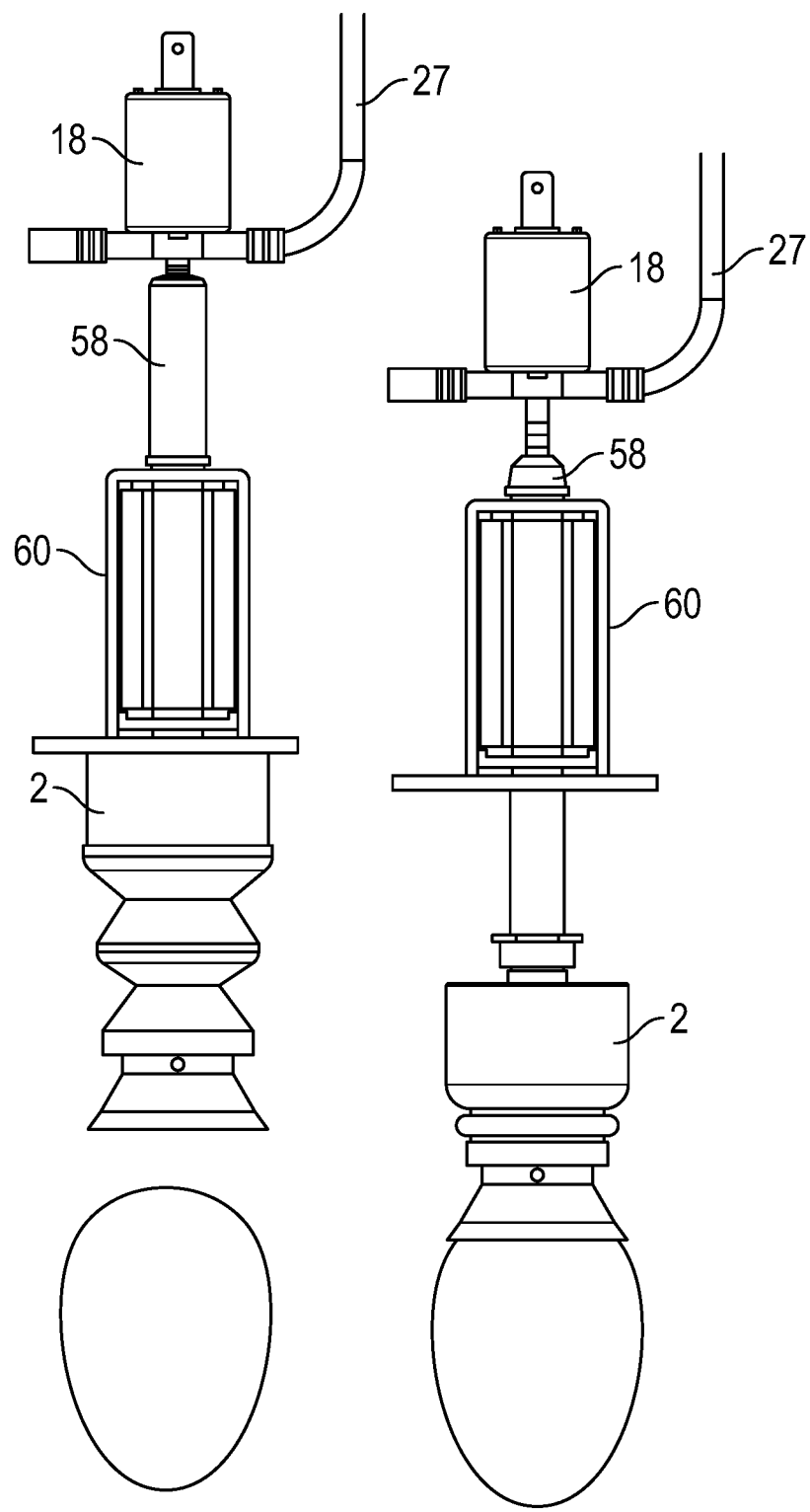
FIG. 19 shows an embodiment of the invention in which each e-PUC may be independently lowered to engage an egg.
Figure 20:
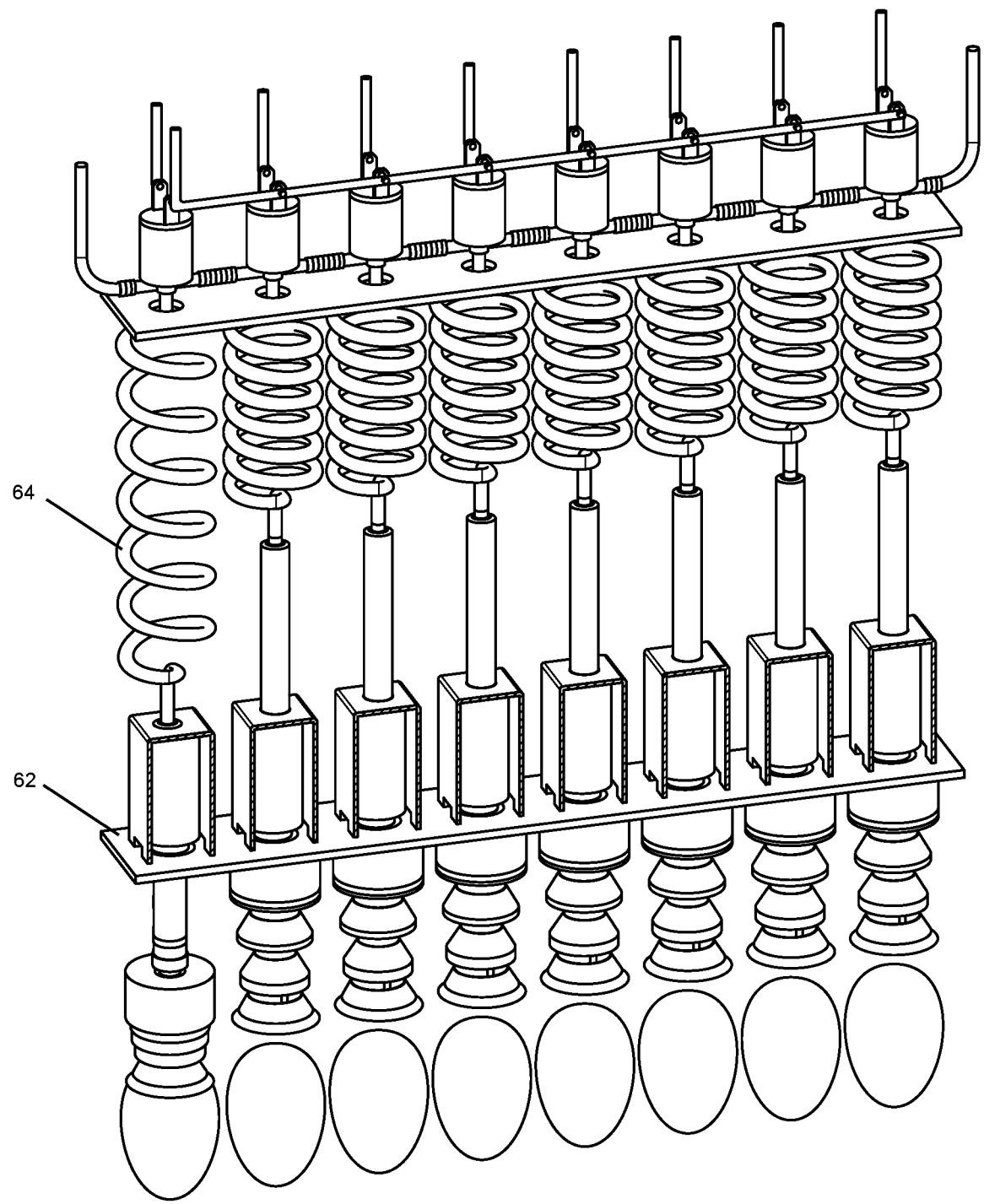
FIG. 20 shows another embodiment of the invention in which each e-PUC may be independently lowered to engage an egg.

According to various alternative embodiments, for example shown in FIGS. 19 and 20, each e-PUC assembly may be provided with a piston assembly under independent control from the control system 30. According to these embodiments, a piston assembly is arranged between the valve assembly and the e-PUC. The valve assembly is attached to the top of a hollow piston 58 that passes through a piston actuator 60. The bottom of the hollow piston 58 is connected to the neck portion 6 of the e-PUC. When the piston actuator 60 is activated, the piston 58 is forced downward forcing the e-PUC onto the egg and compressing the bellows 2. The valve 28 is then closed and the egg is secured to the egg interface due to the reduced pressure inside the bellows as compared to atmospheric pressure. The piston actuator 60 is then de-energized, and the piston 58 returns to the rest position, pulling the egg with it. When the egg is to be released, the piston actuator 60 is again energized, forcing the piston 58 down, the valve 28 is opened equalizing the pressure between the hollow interior 4 of the bellows 2 and atmospheric pressure, and the egg is released, and the piston actuator 60 is de-energized, and the piston 58 returns to the rest position. According to this embodiment, the support plate 16 remains stationary, and optionally, the egg support tray (not shown) also remains stationary, but the valve assembly 18 rides the piston 58 as it moves up and down during each pick-up and release.

The embodiment of FIG. 20, shows another embodiment in which the piston actuator 60 and ePUCs are supported on a second/lower support plate 62. The upper support plate 16 remains stationary and supports the valve assemblies 18. The bottom of the valve assembly is connected to a flexible hose 64 which passes through a respective hole in the upper support plate 16 and is connected to the top of a hollow piston 58. As with the embodiment of FIG. 19, the hollow piston 58 passes through a piston actuator 60, through the second/lower support plate 62 and is connected to the top of the ePUC. When the piston actuator 60 is activated, the piston 58 is forced downward forcing the ePUC onto the egg and compressing the bellows 2. The valve 28 is then closed and the egg is secured to the egg interface due to the reduced pressure inside the bellows as compared to atmospheric pressure. The piston actuator 60 is then de-energized, and the piston 58 returns to the rest position, pulling the egg with it. When the egg is to be released, the piston actuator 60 is again energized, forcing the piston 58 down, the valve 28 is opened equalizing the pressure between the hollow interior 4 of the bellows 2 and atmospheric pressure, and the egg is released, and the piston actuator 60 is de-energized, and the piston 58 returns to the rest position. According to this embodiment, the valve assembly 18 remains stationary about the upper support plate. The lower support plate 62 also remains stationary, and the egg support optionally also remains stationary, and only the piston 58, the flexible hose 64, and the ePUC move up and down as eggs are picked up and released.

Figure 21:
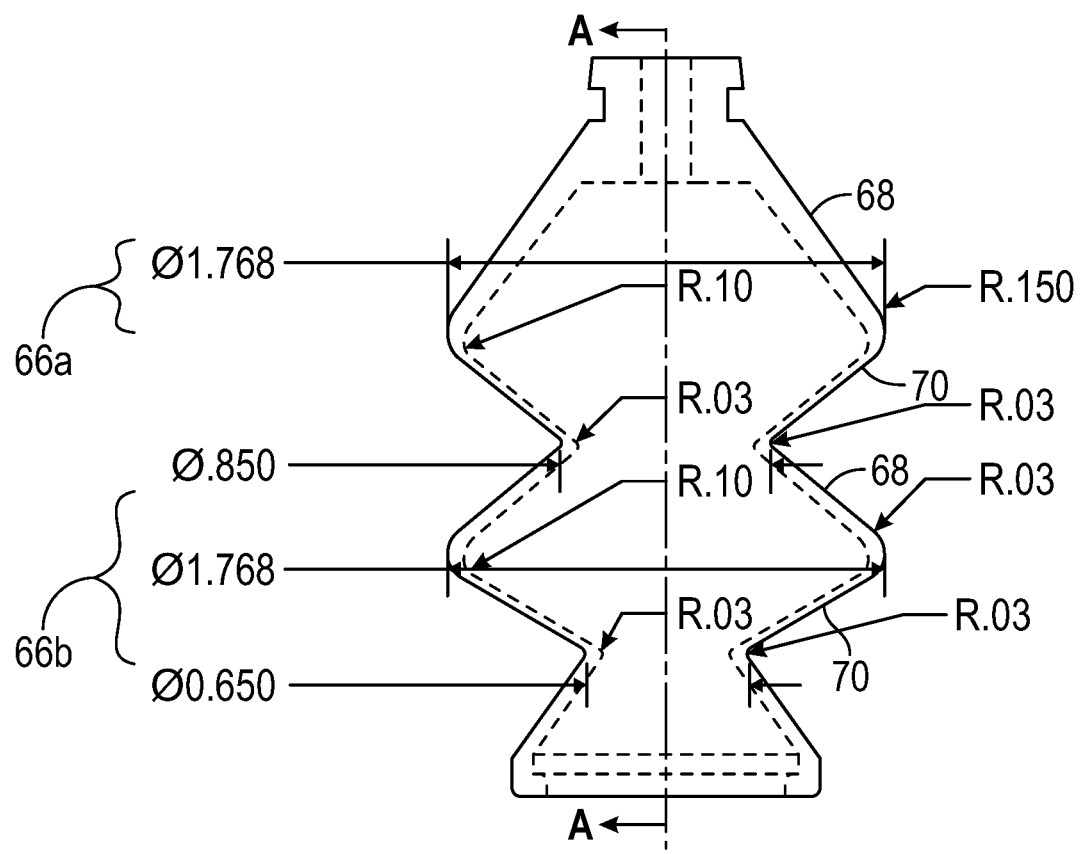
FIG. 21 shows a side view (with interior profile shown in dashed lines) of an e-PUC bellows component according to a further embodiment of the invention.
Figure 22:
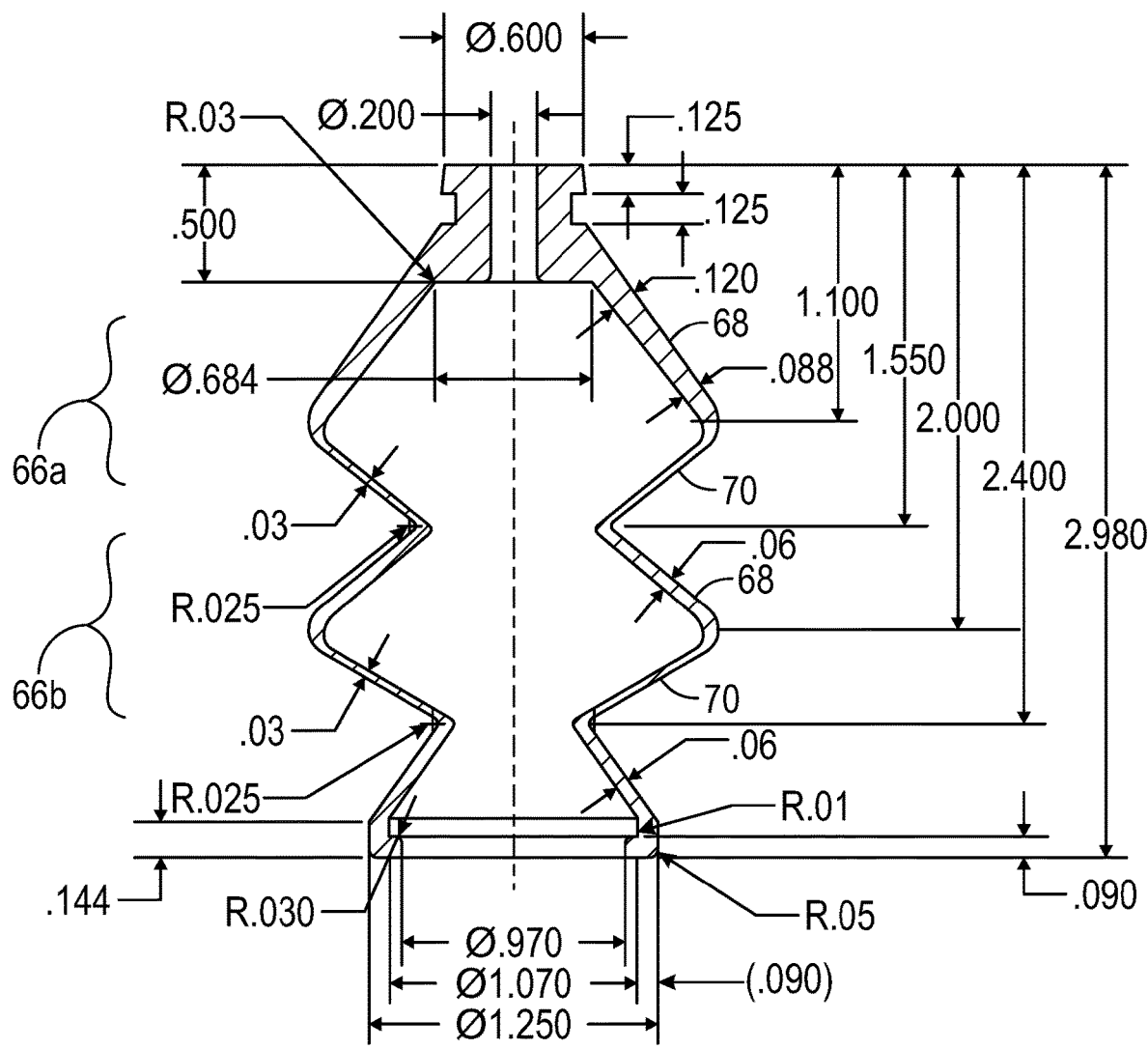
FIG. 22 shows a cross-sectional view of an e-PUC bellows component according to the embodiment of FIG. 21.

In all of the embodiments described herein, the operation of the invention relies on the complete or nearly complete compression of the bellows 2 after the ePUC makes contact with the egg in order to force out the air inside the bellows 2. While each egg is generally sufficiently strong to withstand the compression pressure of a single ePUC, the egg support tray must withstand the compression pressure of an entire array of ePUCs. In order to prevent damage to the egg support tray or other supporting structure due to the combined compression pressure of an entire array of ePUCs (and reduce pressure on each egg itself, thereby reducing even further the risk of breakage), the bottom surfaces 70 of each bellows subsection 66 of the bellows 2 may be formed so that they have a thickness that is less than the thickness of the top surfaces 68 of each bellows subsection 66. See, for example, FIGS. 21 and 22, in which the bottom surfaces 70 of each bellows subsection 66 have a thickness of 0.03 inches as compared to the 0.06 inch thickness of the top surface 68 of the middle bellows subsection 66*b* and the 0.120-0.088 inch thickness of the top surface 68 of the top bellows subsection 66*a*. According to this design, the bellows 2 of the e-PUC will collapse/compress with substantially less force, therefore transmitting substantially less force to the egg support structure as compared to a standard bellows design, but (due to the thicker upper surface) will retain sufficient rigidity to inhibit egg sway and egg-to-egg contact. In addition, the e-PUC bellows may be further designed as shown in FIGS. 21 and 22 with a top bellows subsection 66*a* having a top surface 68 having a thickness that gets smaller as it approaches the transition to the bottom surface 70. By way of example, the topmost portion of the top surface 68 of the top bellows subsection 66*a* in FIG. 22 has a thickness of 0.120 inches which then tapers to 0.088. This tapered bellows subsection top surface 68 can also serve to reduce the force required to compress each bellows, thereby reducing the pressure transmitted to each egg and to the egg support structure.

Therefore, according to various preferred aspects of the invention, a plurality of ePUC assemblies may be configured as required within a support plate, without any centralized or individual source of negative pressure. The ePUC supports the solenoid valve, the solenoid valve intake nozzle impedes the ePUC from collapsing inwardly and releasing itself from the support plate, without the need of additional hardware or tools. The individual ePUC assemblies may be individually, or collectively connected and activated in series to pick up or release objects. The individual ePUC assembly solenoid valves exhaust may be connected individually or collectively in series, making it possible, the use of a gas, e.g. Ozone, to disinfect surfaces prior to pick up, reducing Bio-Burden build-up during prolonged operation.

The solenoid valves will be closed before contacting the surface of the egg for pickup, thus forcing air to evacuate at the point of least resistance, which would be the interface lips. The combination of the object interface lips, and the egg being picked up will function as a non-return or flapper valve, the evacuating air will force excess dirt and contamination away from the egg interface contact point.

The valve shall remain closed during programmed activity and opened to allow fresh air to fill the hollow interior of the bellows and release of the egg. This valving activity forces air to flow in only one direction, into the hollow interior of the bellows from above, and out the bottom of the hollow interior of the bellow, thus preventing and/or minimizing contamination to accrued in the inside of the hollow interior of the bellow.

If the surface of the egg has excessive dirt, debris, or contamination, the valve will be in open position, and air, inert gas or air/ozone combination may be used to blow the surface of the egg prior to contacting it for pickup. As the ePUC contacts the egg, the valve or valves will receive the command to close and the ePUCs will resume previously described operation.

Individual valves placed in each ePUC permits the successful transfer of multiple eggs without the need for make-up vacuum, typically required in the prior art due to losses of negative pressure capacity when one or more suction cups are open to atmosphere.

This innovative concept solution of eliminating the need for a vacuum source, provides significant benefits with the reduction in operating cost of equipment, maintenance requirements, operational downtime, energy consumption, parts, further reduces cross-contamination incidences of mold, bacteria and fungi during operation, and cleaning and/or disinfection time of the equipment.

The valve actuator control system connected to the individual ePUCs can be configured in series or in parallel and in either event can be controlled by a single-signal or output from a PLC.

This innovative concept solution allows for the development of portable transfer equipment operated with a deep cycle type battery, as a source of power, as there is no longer the need of a vacuum generator.

Furthermore, an automated, programmable cleaning cycle can be incorporated into the system simply by connecting fresh air intake to each valve in daisy-chain or manifold capable of distributing a cleaning solution to the individual e-PUCs. Placing a properly sized container under the plurality of e-PUCs, sending a single-signal to the plurality of valves to open condition and apply pressurized cleaning solution to the manifold fresh air intake, once pressurized cleaning solution is transferred to previously placed container, and continue to apply air pressure. The cleaning solution will be collected under e-CUPs in previously placed container until the e-PUCs are submerged in the cleaning solution. The added pressurized air causes an agitating/bubbling action within and around the individual e-PUCs, mechanically scrubbing and removing residues and biomatter. No disassembly of machine and/or system is required and may be done using programmable logic controller (PLC).

It is specifically contemplated that every feature embodiment disclosed herein may be used together with every other feature and embodiment disclosed herein.

The description of the invention is merely exemplary in nature and, thus, variations that do not depart from the concepts described herein are intended to be within the scope of the invention. Any variations from the specific embodiments described herein but which otherwise take advantage of the concepts described herein should not be regarded as a departure from the spirit and scope of the invention set forth in the following claims.

What is claimed is:

1. An assembly for transferring eggs which comprises a valve assembly, a body section and a contact section at a lower portion of said body section that is separable from said body section, said contact section contacting said egg at a location spaced from and encircling a top portion of the egg to enclose a central area over said top portion, said contact section imposing a reduced pressure at said location on said egg to grip said egg without applying negative pressure to said central area over said top portion, said central area being in communication with a surrounding atmosphere through an opening to maintain atmospheric pressure at said central area over said top portion so that a pressure inside said egg in the event of an injection hole in said central area is unaffected by the reduced pressure imposed by said contact section, said opening being configured in said contact section such that air can pass between said central area and said surrounding atmosphere through said opening without entering said body section, wherein said body section is in the form of a flexible bellows defining a collapsible interior chamber with a through bore at a top thereof in selective communication with atmospheric pressure via said valve assembly defining an air path between said through bore and at least one exterior port, said air path having a valve therein for selectively opening and closing said air path, wherein in a pick-up mode, the flexible bellows are compressed, the valve is closed preventing the entry of air into the collapsible interior chamber, wherein separation of the egg from an egg support causes extension of the flexible bellows and creation of reduced pressure in the collapsible interior chamber relative to surrounding atmosphere, securing the egg to the contact section, and wherein in a drop-off mode, the valve is opened, allowing the entry of air into the collapsible interior chamber, equalizing pressure between the collapsible interior chamber and the surrounding atmosphere, allowing the flexible bellows to relax and release of the egg from the contact section.

2. The assembly as defined in claim 1, wherein said flexible bellows have a first and second bellows-subsections having equal maximum cross-sectional diameter, each of said first and second bellows-subsections characterized by an outwardly sloping surface which transitions to an inwardly sloping surface resulting in alternating wider and narrower diameters of said hollow body portion, wherein each inwardly sloping surface has a thickness that is less than a thickness of a corresponding outwardly sloping section.

3. The assembly as defined in claim 2, wherein an outwardly sloping surface of an uppermost bellows-subsection has tapered thickness.

4. The assembly as defined in claim 1, wherein said opening is in a lateral side wall of said contact section.

5. The assembly as defined in claim 1, wherein said contact section contacts said egg in a generally circular location spaced around said central area and said reduced pressure between said contact section and said egg is in a circular ring at said spaced circular location.

6. The assembly as defined in claim 1, wherein said contact section is defined by a flexible cup and conforms to a surface of said egg where contacted.

7. The assembly as defined in claim 1, wherein said reduced pressure is caused solely by extension of the flexible bellows and the weight of the egg when the valve is closed, and wherein no source of negative pressure is connected to said collapsible interior chamber.

8. The assembly as defined in claim 7, wherein said contact section is generally cylindrical and includes a top wall that separates the central area from the collapsible interior chamber.

9. The assembly as defined in claim 8, wherein a lower end of said contact section has an outer side and an inner side, said outer side tapering outwardly to a flexible outer seal which forms a first circular seal with the egg shell, said inner side including an inner seal which forms a second circular seal with the egg shell that is inwardly and above said first circular seal.

10. The assembly as defined in claim 9, wherein said lower end of said contact section and said first and second circular seals form a generally circular ring, said extension of the flexible bellows with the valve closed is the sole source of reduced pressure in said generally circular ring.

11. The assembly as defined in claim 10, wherein said contact section includes an annular midsection having at least one vertical hole that provides airflow communication between the circular ring and the collapsible interior chamber.

12. The assembly as defined in claim 1, wherein said body section is in the form of a bellows that is flexible in both vertical and horizontal directions to accommodate different size eggs as well as differences in angular orientation of the eggs.

13. The assembly as defined in claim 1, wherein said valve assembly has exactly one exterior port, said air path connects said through bore only to said exactly one exterior port.

14. The assembly as defined in claim 1, wherein said valve assembly has two exterior ports and said air path is connected to an adjacent air path of an adjacent valve assembly.

* * * * *